(12) United States Patent
Wang

(10) Patent No.: US 12,339,171 B1
(45) Date of Patent: Jun. 24, 2025

(54) TEMPERATURE MEASUREMENT DEVICE

(71) Applicant: Finemold Technologies Co., Ltd, Shenzhen (CN)

(72) Inventor: BaoHong Wang, Shenzhen (CN)

(73) Assignee: Finemold Technologies Co., Ltd, Shenzhen (CN)

( * ) Notice: Subject to any disclaimer, the term of this patent is extended or adjusted under 35 U.S.C. 154(b) by 0 days.

(21) Appl. No.: 19/017,798

(22) Filed: Jan. 13, 2025

(30) Foreign Application Priority Data

Dec. 30, 2024 (CN) .......................... 202411960533.4

(51) Int. Cl.
*G01K 1/14* (2021.01)
*G01D 21/02* (2006.01)
*G01K 1/024* (2021.01)

(52) U.S. Cl.
CPC .............. *G01K 1/14* (2013.01); *G01D 21/02* (2013.01); *G01K 1/024* (2013.01); *G01K 2207/06* (2013.01)

(58) Field of Classification Search
CPC ...... G01K 1/14; G01K 1/024; G01K 2207/06; G01D 21/02
See application file for complete search history.

(56) References Cited

U.S. PATENT DOCUMENTS

| | | | | |
|---|---|---|---|---|
| 3,974,696 A * | 8/1976 | Fitzmayer | ................. | F24C 7/02 374/185 |
| 5,915,838 A * | 6/1999 | Stals | ...................... | G01R 19/32 374/45 |
| 6,753,027 B1 * | 6/2004 | Greiner | .................. | G01K 1/026 374/E7.042 |
| 2005/0012627 A1 * | 1/2005 | Lion | ...................... | G01K 1/024 374/E1.004 |
| 2009/0324785 A1 * | 12/2009 | Ceravalls Pujol | ..... | G01K 1/026 99/325 |
| 2014/0086274 A1 * | 3/2014 | Henke | ...................... | G01K 1/14 374/142 |
| 2015/0173129 A1 * | 6/2015 | Tils | ....................... | G01K 15/007 374/1 |
| 2018/0324908 A1 * | 11/2018 | Denker | ................ | H05B 6/6467 |
| 2019/0049314 A1 * | 2/2019 | Chu | ........................ | G01K 13/00 |
| 2019/0285483 A1 * | 9/2019 | Cheng | ..................... | F24C 7/085 |
| 2021/0010870 A1 * | 1/2021 | Kristensen | ............. | G01K 1/026 |
| 2021/0231503 A1 * | 7/2021 | Wu | ......................... | G01K 1/024 |
| 2022/0049992 A1 * | 2/2022 | Nivala | ................... | G01K 1/024 |

(Continued)

*Primary Examiner* — Laura Martin
*Assistant Examiner* — Philip L Cotey
(74) *Attorney, Agent, or Firm* — Ricky Lam

(57) ABSTRACT

The present disclosure provides a temperature measurement device, comprising: a hollow cylinder comprising a low-temperature section inserted into food, a high-temperature section exposed to air, and a transition section separating the low-temperature section and the high-temperature section; and a posture detection system for detecting whether the low-temperature section and the transition section are completely inserted into the food, wherein, the posture detection system comprises a first temperature sensing unit arranged in the low-temperature section and used to measure the temperature of a tip of the temperature measurement device, and a second temperature sensing unit arranged in the transition section and used to measure the temperature of the transition section of the temperature measurement device.

19 Claims, 5 Drawing Sheets

(56) References Cited

U.S. PATENT DOCUMENTS

| | | | | |
|---|---|---|---|---|
| 2022/0400195 | A1* | 12/2022 | Churovich | G01K 1/02 |
| 2023/0251141 | A1* | 8/2023 | Cheng | G01K 1/024 |
| | | | | 374/149 |
| 2023/0333579 | A1* | 10/2023 | Young | G05D 23/19 |
| 2024/0096194 | A1* | 3/2024 | Allen, Sr. | G08B 21/182 |
| 2024/0175761 | A1* | 5/2024 | Cheng | G01K 1/026 |

* cited by examiner

TEMPERATURE MEASUREMENT DEVICE

FIELD

The present disclosure relates to the field of temperature measurement, and more specifically, to a temperature measurement device.

BACKGROUND

In the process of high-temperature baking, it is often necessary to insert temperature measurement devices (such as temperature measuring probes) into food, such as meat, for temperature measurement to monitor the temperature of the food. The part of the temperature measurement device inserted into food is the low-temperature portion due to the thermal cooling effect of the food, while the part of the temperature measurement device exposed to the air is the high-temperature portion. Food can protect the temperature measurement device from high temperatures. During the use of temperature measurement device, it is necessary to insert the device into food according to the usage specifications to avoid electronic components from failure due to high temperatures. However, food, especially meat, may shrink during baking, leading to dynamic changes in the insertion state or posture of temperature measurement devices. For example, meat may shrink due to heat, and will make the portion of the temperature measurement device inserted into the food expose to air. Therefore, there is an urgent need to provide a temperature measurement device that can monitor the insertion status in real time and has error posture alarm function and accurate and sensitive temperature measurement.

By setting temperature sensing units or temperature sensors at multiple positions of the temperature measurement device to alert or warn of incorrect posture, it can effectively remind users of incorrect usage methods or habits, and improve the service life of the temperature measurement device. In addition, the temperature sensing unit or sensor embedded inside the metal body or cylinder of the temperature measurement device has significant deviation in the actual temperature measurement process. The main reason is that the metal body or cylinder of the temperature measurement device is generally made of high-strength and thermally conductive materials such as steel. The temperature sensing unit or sensor arranged inside the metal body or cylinder adopts a point-point contact method with the metal body or cylinder, and due to uneven heating of the metal body, there are significant deviation in the temperature measurement of the temperature sensing unit or sensor. The problem of large temperature measurement errors can be improved by setting face-face coaxial thermal conductive channels inside the metal body or cylinder.

SUMMARY

In view of the above and other ideas, the present disclosure is proposed.

According to one aspect of the present application, there is provided a temperature measurement device comprising:
a hollow cylinder comprising a low-temperature section inserted into food, a high-temperature section exposed to air, and a transition section separating the low-temperature section and the high-temperature section; and a posture detection system for detecting whether the low-temperature section and the transition section are completely inserted into the food, wherein, the posture detection system comprises a first temperature sensing unit arranged in the low-temperature section and used to measure the temperature of a tip of the temperature measurement device, and a second temperature sensing unit arranged in the transition section and used to measure the temperature of the transition section of the temperature measurement device.

In one embodiment, wherein when the tip penetrates the food and is exposed to the air, the temperature measured by the first temperature sensing unit exceeds a first safety threshold, and the posture detection system detects a first incorrect posture of the temperature measurement device and sends a first alarm signal; when the tip is inserted in the food and the transition section is exposed to the air, the temperature measured by the second temperature sensing unit exceeds a second safety threshold, and the posture detection system detects a second incorrect posture of the temperature measurement device and sends a second alarm signal; when the tip and the transition section are inserted in the food and not exposed to the air, the temperature measured by the first temperature sensing unit is less than the first safety threshold, the temperature measured by the second temperature sensing unit is less than the second safety threshold, and the posture detection system does not send an alarm signal.

In one embodiment, the second temperature sensing unit comprises a second temperature sensing probe and a second thermal conductive column, the second thermal conductive column is coaxial with the hollow cylinder, and the second thermal conductive column is closely attached to an inner surface of the hollow cylinder to form a face-face coaxial thermal conductive channel.

In one embodiment, the second thermal conductive column is a hollow column extending along a length direction of the hollow cylinder and comprises a second inner surface and a second outer surface, the second temperature sensing probe is attached to the second inner surface, and the second outer surface is closely attached to the hollow cylinder.

In one embodiment, the posture detection system further comprises a third temperature sensing unit arranged in the low-temperature section and located between the first temperature sensing unit and the second temperature sensing unit.

In one embodiment, the third temperature sensing unit comprises a third temperature sensing probe and a third thermal conductive column, the third thermal conductive column is coaxial with the hollow cylinder, and the third thermal conductive column is closely attached to the hollow cylinder to construct the face-face coaxial thermal conductive channel.

In one embodiment, the third thermal conductive column is a hollow column extending along the length direction of the hollow cylinder, the third temperature sensing probe is attached to an inner surface of the third thermal conductive column, and an outer surface of the third thermal conductive column is closely attached to the hollow cylinder.

In one embodiment, when the tip and the transition section are inserted in the food and not exposed to the air, the temperature measurement device takes the minimum value of the temperature measured by the first temperature sensing unit, the second temperature sensing unit, and the third temperature sensing unit as a food temperature measured by the temperature measurement device.

In one embodiment, the temperature measurement device further comprises a fourth temperature sensing unit arranged in the high-temperature section, wherein the fourth temperature sensing unit comprises a fourth temperature sensing probe and a fourth heat conductor, and the fourth temperature sensing probe is in contact with the fourth heat conductor.

In one embodiment, the fourth heat conductor comprises a connecting portion for connecting the fourth temperature sensing probe, and a protruding portion extending outside the temperature measurement device.

In one embodiment, the connecting portion is a hollow extension portion arranged at one end of the fourth heat conductor near the fourth temperature sensing probe, and the hollow extension portion is used to accommodate the fourth temperature sensing probe.

In one embodiment, the temperature measurement device further comprises a handle arranged in the high-temperature section and connected to the hollow cylinder, wherein the connecting portion penetrates the handle and the protruding portion is located outside the handle.

In one embodiment, the temperature measurement device further comprises a circuit board unit extending from the low-temperature section to the high-temperature section, and the first temperature sensing unit, the second temperature sensing unit, the third temperature sensing unit, and the fourth temperature sensing unit are connected to the circuit board unit.

In one embodiment, the posture detection system further comprises a storage unit, wherein the storage unit stores the first safety threshold and the second safety threshold.

In one embodiment, the posture detection system further comprises a processing unit configured to process the temperatures obtained by the first temperature sensing unit, the second temperature sensing unit, the third temperature sensing unit, and the fourth temperature sensing unit.

In one embodiment, the processing unit comprises a built-in processor integrated into the temperature measurement device or a remote processor separately set from the temperature measurement device.

In one embodiment, the c is configured to take the minimum value of the temperature measured by the first temperature sensing unit, the second temperature sensing unit, and the third temperature sensing unit as the food temperature measured by the temperature measurement device.

In one embodiment, the second thermal conductive column and the third thermal conductive column comprise flexible copper sheets, and when the second thermal conductive column or the third thermal conductive column is placed in the hollow cylinder, the flexible copper sheets are deformed and bent by the hollow cylinder, forming the second thermal conductive column and the third thermal conductive column.

In one embodiment, wherein the second thermal conductive column does not contact with the third thermal conductive column.

In one embodiment, the first temperature sensing unit comprises an elastic arm and a first temperature sensing probe, and the first temperature sensing unit extends from the circuit board unit to the inner wall of the tip through the elastic arm, so that the first temperature sensing probe is closely attached to the inner wall of the tip.

By setting temperature sensing units or temperature sensors at multiple positions of the temperature measurement device to alert or warn of incorrect posture, it can effectively remind users of incorrect usage methods or habits, and improve the service life of the temperature measurement device. In addition, the temperature sensing unit or sensor embedded inside the metal body or cylinder of the temperature measurement device has significant errors in the actual temperature measurement process. The main reason is that the metal body or cylinder of the temperature measurement device is generally made of high-strength and thermally conductive materials such as steel. The temperature sensing unit or sensor arranged inside the metal body or cylinder adopts a point-point contact method with the metal body or cylinder, and due to uneven heating of the metal body, there are significant errors in the temperature measurement of the temperature sensing unit or sensor. The problem of large temperature measurement errors can be improved by setting face-face coaxial thermal conductive channels inside the metal body or cylinder.

More embodiments of the present application can also achieve other advantageous technical effects not listed one by one, which may be partially described in the following text and can be expected and understood by those skilled in the art after reading the present application.

BRIEF DESCRIPTION OF THE DRAWINGS

In order to provide a clearer explanation of the technical solution in the embodiments of the present application, a brief introduction will be given below to the accompanying drawings required in the embodiments or prior art descriptions. It is evident that the accompanying drawings in the following description are only some embodiments of the present application. For those skilled in the art, other accompanying drawings can be obtained based on these drawings without the need for creative labor.

DETAILED DESCRIPTION

Figure 1:
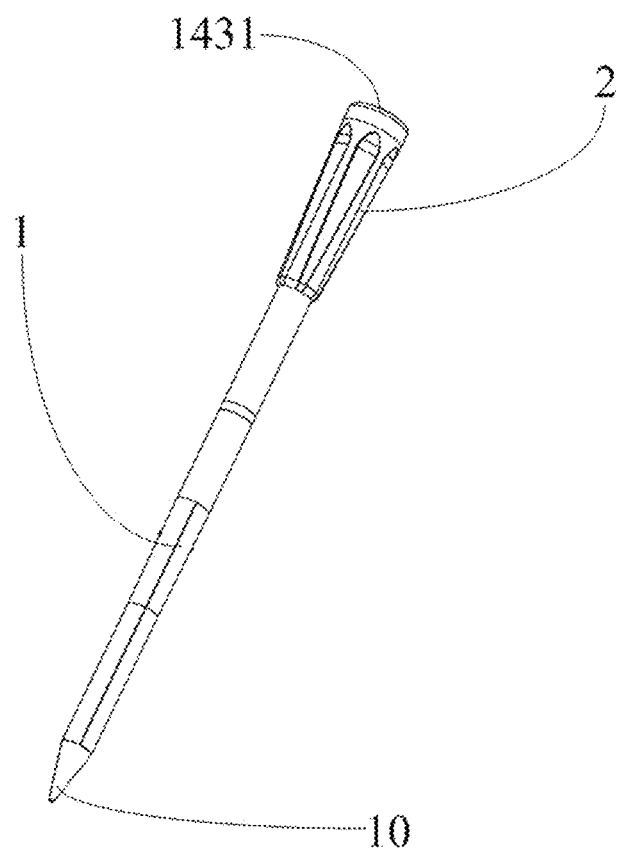
FIG. 1 shows a perspective view of the temperature measurement device of the present application.

In order to clarify the purpose, technical solution, and advantages of the embodiments of the present disclosure, the following will provide a clear and complete description of the technical solution in the embodiments of the present disclosure in conjunction with the accompanying drawings. Obviously, the described embodiments are one part of the embodiments of the present disclosure, not all of them. The components of the embodiments of the present disclosure described and illustrated in the accompanying drawings can be arranged and designed in various different configurations.

Therefore, the detailed description of the embodiments of the present disclosure provided in the accompanying drawings is not intended to limit the scope of the present disclosure, but only to represent selected embodiments of the present disclosure. Based on the embodiments in the present disclosure, all other embodiments obtained by ordinary skilled persons in this field without creative labor are within the scope of protection of the present disclosure.

It should be noted that similar labels and letters represent similar items in the following figures. Therefore, once an item is defined in one figure, it does not need to be further defined and explained in subsequent figures.

It should be understood that the terms "up", "down", "front", "back", "left", "right", "horizontal", etc. indicate the orientation or position relationship based on the orientation or position relationship shown in the drawings, only for the convenience of describing and simplifying the description of the present application, rather than indicating or implying that the device or component referred to must have a specific orientation, be constructed and operated in a specific orientation, and therefore cannot be understood as a limitation of the present application. In addition, the terms "first", "second", "third", etc. are only used to distinguish descriptions and cannot be understood as indicating or implying relative importance. In the description of the present disclosure, unless otherwise specified, the meaning of "multiple" refers to two or more.

As used in this application, the terms "installation", "connection", "connecting", "fixed" and other terms should be broadly understood, for example, they can be fixed connections, detachable connections, or integrated connections; It can be a mechanical connection or an electrical connection; It can be directly connected, or indirectly connected through an intermediate medium, or it can be an internal connection between two components. For ordinary technical personnel in this field, the specific meanings of the above terms in this application can be understood based on specific circumstances.

In the present disclosure, unless otherwise specified and limited, the first feature above or below the second feature may include direct contact between the first and second features, or may include contact between the first and second features through another feature between them instead of direct contact. Moreover, the first feature being "above", and "on" the second feature includes the first feature being directly above and diagonally above the second feature, or simply indicating that the first feature is horizontally higher than the second feature. The first feature being "below" include the first feature being directly below and diagonally below the second feature, or simply indicating that the first feature has a lower horizontal height than the second feature.

The embodiments of the present disclosure are described in detail below, and examples of the embodiments are shown in the accompanying drawings, where the same or similar reference numerals from beginning to end represent the same or similar elements or elements with the same or similar functions. The embodiments described below with reference to the accompanying drawings are exemplary and are only used to explain the present disclosure, and should not be understood as limiting the present disclosure.

The following will provide a more detailed description of the present application with reference to specific embodiments.

FIGS. 1-4 show a temperature measurement device that is elongated and can be used to measure the temperature during high-temperature processing of food. The temperature measurement device includes a hollow cylinder 1, a handle 2 connected to the hollow cylinder 1, and a circuit board unit 3 located inside the hollow cylinder 1. The circuit board unit 3 is connected to multiple temperature sensing units and battery unit 30. The hollow cylinder 1 can be made of metal material and has a tip 10 for inserting food. Since metal material is a good conductor of heat, using metal material as tip 10 is beneficial for rapid heat transfer to the temperature sensing unit inside the tip 10.

Specifically, as shown in FIGS. 1-4, the temperature measurement device comprises a hollow cylinder 1, which includes a low-temperature section 11 inserted into food, a high-temperature section 13 exposed to air, and a transition section 12 separating the low-temperature section 11 and the high-temperature section 13. The low-temperature section 11 has the lowest temperature compared to other sections due to its insertion into food and the food thermal isolation and cooling action. The high-temperature section 13 has the highest temperature relative to other sections due to exposure to high-temperature air. The transition section 12 is located between the low-temperature section 11 and the high-temperature section 13, and is subjected to thermal conduction from high-temperature section 13, resulting in its temperature between low-temperature section 11 and high-temperature section 13. When temperature measurement device is used for temperature measurement, there are many electronic components in the low-temperature section 11 and the transition section 12 that cannot withstand high temperatures. Therefore, inserting the low-temperature section 11 and the transition section 12 into food to avoid exposure to high-temperature air is the operating standard for temperature measurement device.

Figure 4:
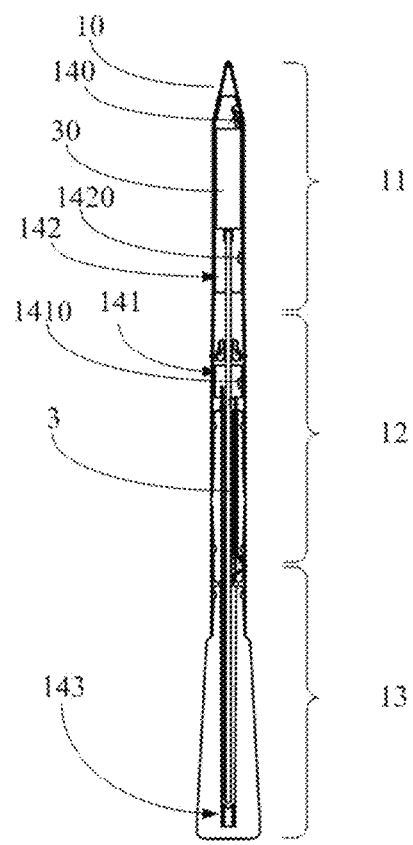
FIG. 4 shows a cross-sectional view of the temperature measurement device of the present application.

As shown in FIG. 4, the temperature measurement device also includes a posture detection system, which is used to detect whether the low-temperature section 11 and the transition section 12 are completely inserted into the food. The posture detection system includes a first temperature sensing unit 140 arranged in the low-temperature section 11 and used to measure the temperature of the tip 10 of the temperature measurement device, and a second temperature sensing unit 141 arranged in the transition section 12 and used to measure the temperature of the transition section 12 of the temperature measurement device. The temperature measurement device also includes a handle 2, which is arranged in the high-temperature section 13 and connected to the hollow cylinder 1. The handle 2 can be made of high-temperature resistant plastic, metal, or ceramic.

When using the temperature measurement device, the low-temperature section 11 and the transition section 12 need to be inserted into the food. Once one part of the low-temperature section 11 and/or the transition section 12 is exposed to high-temperature air, the temperature sensing unit located in the low-temperature section 11 or the transition section 12 will detect abnormal temperature values.

Traditional temperature sensors have a small measurement area, and the internal temperature distribution of food during baking is uneven, so the measured temperature is often too high or too low, with a large deviation from the actual temperature of the food. The temperature measurement device of the present disclosure adopts a face-face temperature measurement method, which increases the measurement area of the food, thereby better reflecting the actual temperature of the food and improving measurement accuracy.

Figure 2:
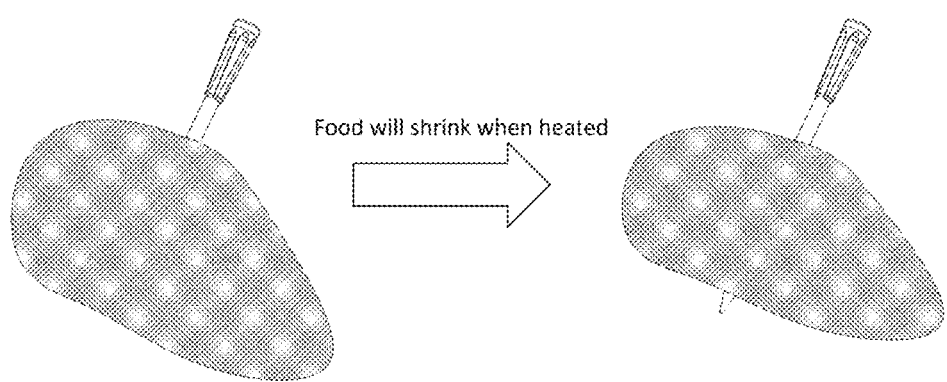
FIG. 2 shows the first incorrect posture of the temperature measurement device of the present application when inserted into food, where the tip penetrates the food and is exposed to the high-temperature air.
Figure 3:
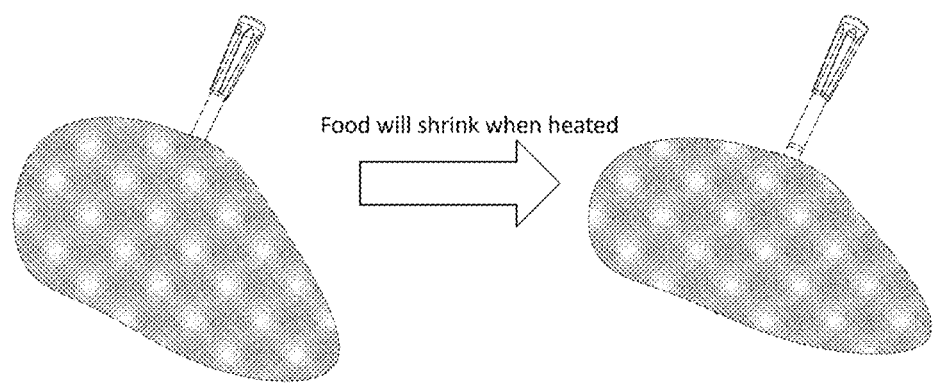
FIG. 3 shows the second incorrect posture of the temperature measurement device of the present application when inserted into food, where the transition section is not inserted into the food and exposed to the high-temperature air.

Usually, during using the temperature measurement device, the temperature measurement device need to be inserted into food according to the usage specifications. However, food, especially meat, undergoes volume shrinkage during baking, which may result in dynamic changes in the insertion state or posture of temperature measurement devices. Therefore, a real-time monitoring of the insertion posture of the temperature measurement device is necessary. For example, meat may shrink due to heat, resulting in the tip 10 or the transition section 12 of the temperature measurement device to be exposed to the air. As shown in FIG. 2, when the tip 10 penetrates the food and is exposed to the air, the temperature measured by the first temperature sensing unit 140 exceeds the first safety threshold, and the posture detection system detects a first incorrect posture of the temperature measurement device and sends the first alarm signal. As shown in FIG. 3, when the tip 10 is inserted into the food and the transition section 12 is exposed to the air, the temperature measured by the second temperature sensing unit 141 exceeds the second safety threshold, and the posture detection system detects a second incorrect posture of the temperature measurement device and sends a second alarm signal. When the tip 10 and the transition section 12 are inserted into the food and not exposed to the air, the temperature measured by the first temperature sensing unit 140 is less than the first safety threshold, and the temperature measured by the second temperature sensing unit 141 is less than the second safety threshold. The posture detection system does not send an alarm signal. Through the above posture detection system, users can monitor the posture or status safety of temperature measurement device in real time, avoiding malfunctions caused by incorrect posture of temperature measurement device.

Figure 5:
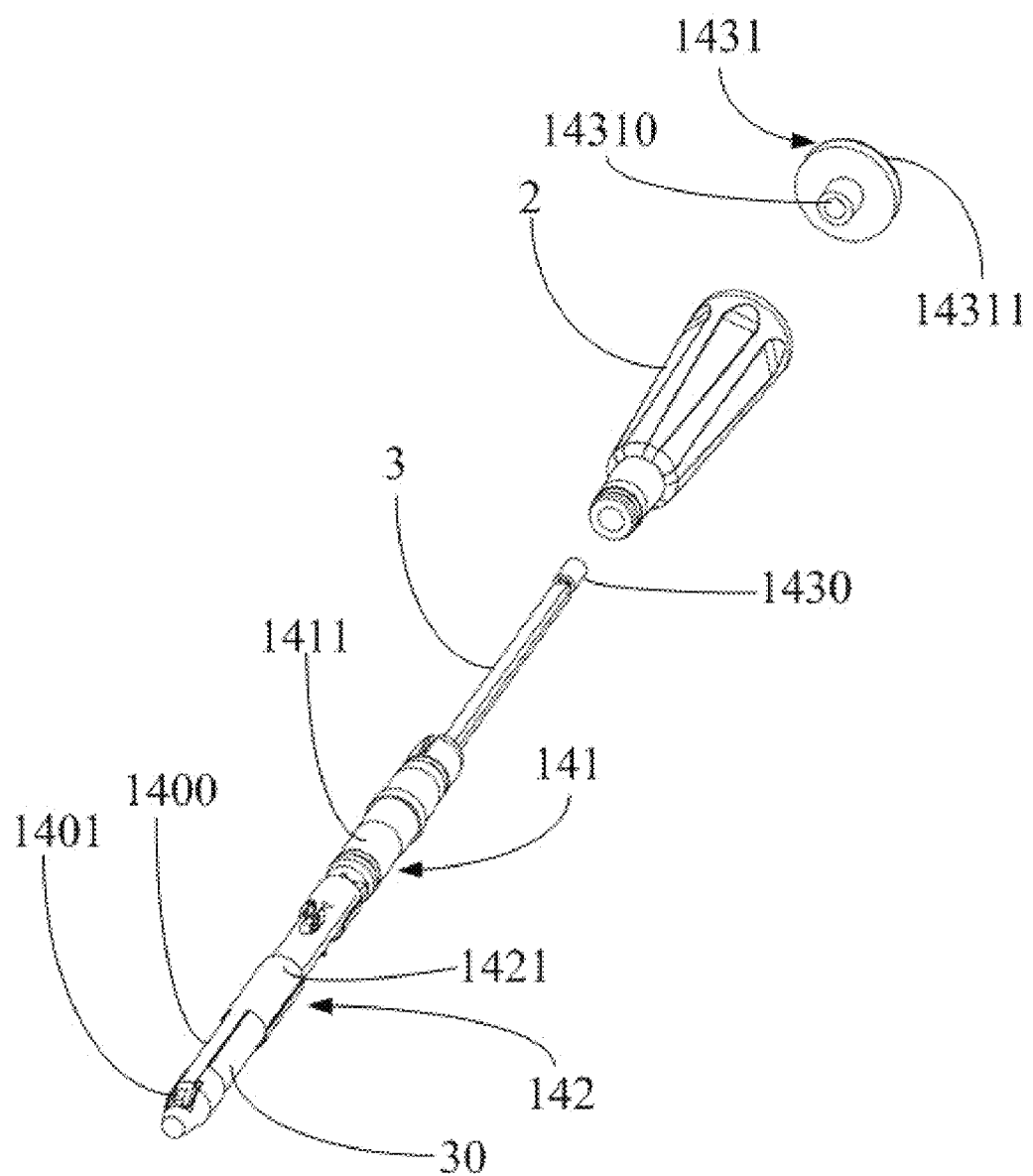
FIG. 5 shows the internal structure diagram of the temperature measurement device of the present application.
Figure 6:
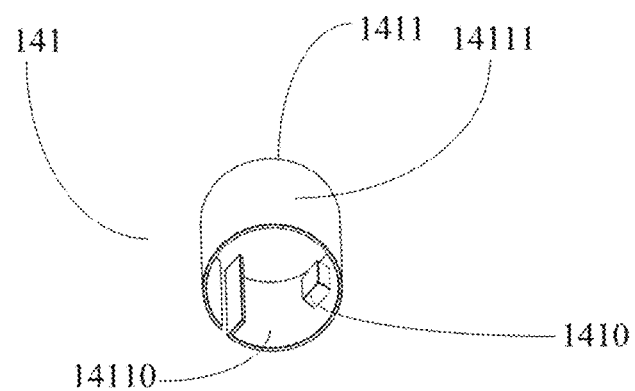
FIG. 6 shows a perspective view of the second temperature sensing unit of the temperature measurement device of the present application.

As shown in FIG. 5, the first temperature sensing unit 140 includes an elastic arm 1400 and a first temperature sensing probe 1401. The first temperature sensing unit 140 extends from the circuit board unit 3 to the inner wall of the tip 10 through the elastic arm 1400, so that the first temperature sensing probe 1401 is closely attached to the inner wall of the tip 10.

As shown in FIGS. 4 and 5, the second temperature sensing unit 141 includes a second temperature sensing probe 1410 and a second thermal conductive column 1411. The second thermal conductive column 1411 is coaxial with the hollow cylinder 1 and closely adheres to the inner surface of the hollow cylinder 1 to form a face-face coaxial thermal conductive channel. The second thermal conductive cylinder 1411 is a hollow cylinder extending along a length direction of the hollow cylinder 1 and includes a second inner surface 14110 and a second outer surface 14111. The second temperature sensing probe 1410 is attached to the second inner surface 14110, and the second outer surface 14111 is closely attached to the hollow cylinder 1. The second thermal conductive cylinder 1411 can be prepared from metals such as copper.

As shown in FIGS. 4 and 5, the posture detection system also includes a third temperature sensing unit 142 arranged in the low-temperature section 11 and located between the first temperature sensing unit 140 and the second temperature sensing unit 141. The third temperature sensing unit 142 includes a third temperature sensing probe 1420 and a third thermal conductive column 1421. The third thermal conductive column 1421 is coaxial with the hollow cylinder 1, and is closely attached to the hollow cylinder 1 to form a face-face coaxial thermal conductive channel. The third thermal conductive column 1421 is a hollow column extending along the length direction of the hollow cylinder 1. The third temperature sensing probe 1420 is attached to an inner surface of the third thermal conductive column 1421, and the outer surface of the third thermal conductive column 1421 is closely attached to the hollow cylinder 1. The third thermal conductive cylinder 1421 can be prepared from metals such as copper.

The face-face thermal conductive channel has higher temperature measurement accuracy compared to the point-point thermal conductivity method. The coaxial thermal conductive channel formed by the second thermal conductivity column 1411 or the third thermal conductivity column 1421 and the hollow cylinder 1, as well as the high thermal conductivity of the second thermal conductivity column 1411 or the third thermal conductivity column 1421, can effectively improve temperature measurement accuracy. The hollow cylinder 1 is generally made of high-strength metals or alloys such as steel, and its thermal conductivity is lower than that of the second thermal conductive column 1411 or the third thermal conductive column 1421. Therefore, the temperature on the surface of the hollow cylinder 1 is often uneven. The face-face coaxial heat conductive channel formed by the hollow cylinder 1 and the second or third heat conduction column 1411 or 1421 is beneficial for the uneven temperature on the surface of the hollow cylinder 1 to be conducted to the second or third heat conduction column 1411 or 1421 with good thermal conductivity, and thus makes the temperature measured by the second or third temperature sensing probe 1410 or 1420 more accurate.

When the tip 10 and the transition section 12 are inserted into the food and not exposed to air, the temperature measurement device takes the minimum temperature measured by the first temperature sensing unit 140, the second temperature sensing unit 141, and the third temperature sensing unit 142 as the food temperature measured by the temperature measurement device.

As shown in FIGS. 4 and 5, the temperature measurement device also includes a fourth temperature sensing unit 143 arranged in the high-temperature section 13. The fourth temperature sensing unit 143 includes a fourth temperature sensing probe 1430 and a fourth heat conductor 1431, with the fourth temperature sensing probe 1430 in contact with the fourth heat conductor 1431. The fourth temperature sensing unit 143 is an environment temperature sensing unit. The environmental temperature sensing unit is used to measure the environment temperature. When the temperature measurement device is placed in an oven for use, the environment temperature sensing unit is used to measure the environment temperature in the oven. The end of the fourth heat conductor 1431 away from the fourth temperature sensing probe 1430 may have a protruding portion 14311, which is located outside the handle 2 or temperature measurement device. A relief hole is arranged on handle 2 for the fourth heat conductor 1431 to extend outward to form a protruding portion 14311, as shown in FIG. 1. The end of the fourth heat conductor 1431 near the fourth temperature sensing probe 1430 is provided with a connecting portion 14310 that is connected to the fourth temperature sensing probe 1430, and the connecting portion 14310 penetrates the handle 2. The connecting portion 14310 is a hollow extension portion with a accommodating chamber. The fourth temperature sensing probe 1430 is accommodated in the accommodating chamber to fix the fourth temperature sensing probe 1430. Of course, the protruding portion 14311 is not limited to the structure shown in FIG. 5.

When the fourth temperature sensing unit 143 extends to the outside of the handle 2, the fourth heat conductor 1431 of the fourth temperature sensing unit 143 directly contacts the environment temperature and quickly conducts the environment temperature to the fourth temperature sensing probe 1430 inside, which can improve the temperature measurement accuracy of the fourth temperature sensing unit 143. The fourth heat conductor 1431 can be made of metal or alloy such as steel or copper, which facilitates the rapid conduction of external environmental temperature to the fourth temperature sensing probe 1430, achieving balance between internal and external temperatures and precise temperature measurement.

As shown in FIGS. 4 and 5, the temperature measurement device also includes a circuit board unit 3, which can extend from the low-temperature section 11 to the high-temperature section 13. The first temperature sensing unit 140, the second temperature sensing unit 141, the third temperature sensing unit 142, and the fourth temperature sensing unit 143 are connected to the circuit board unit 3. The battery unit 30 and electronic components on the circuit board unit 3 cannot withstand high temperatures. Setting the battery unit 30 and electronic components of the circuit board unit 3 near the tip 10 of the hollow cylinder 1 is beneficial for protecting the circuit board unit 3 from high temperatures.

Figure 7:
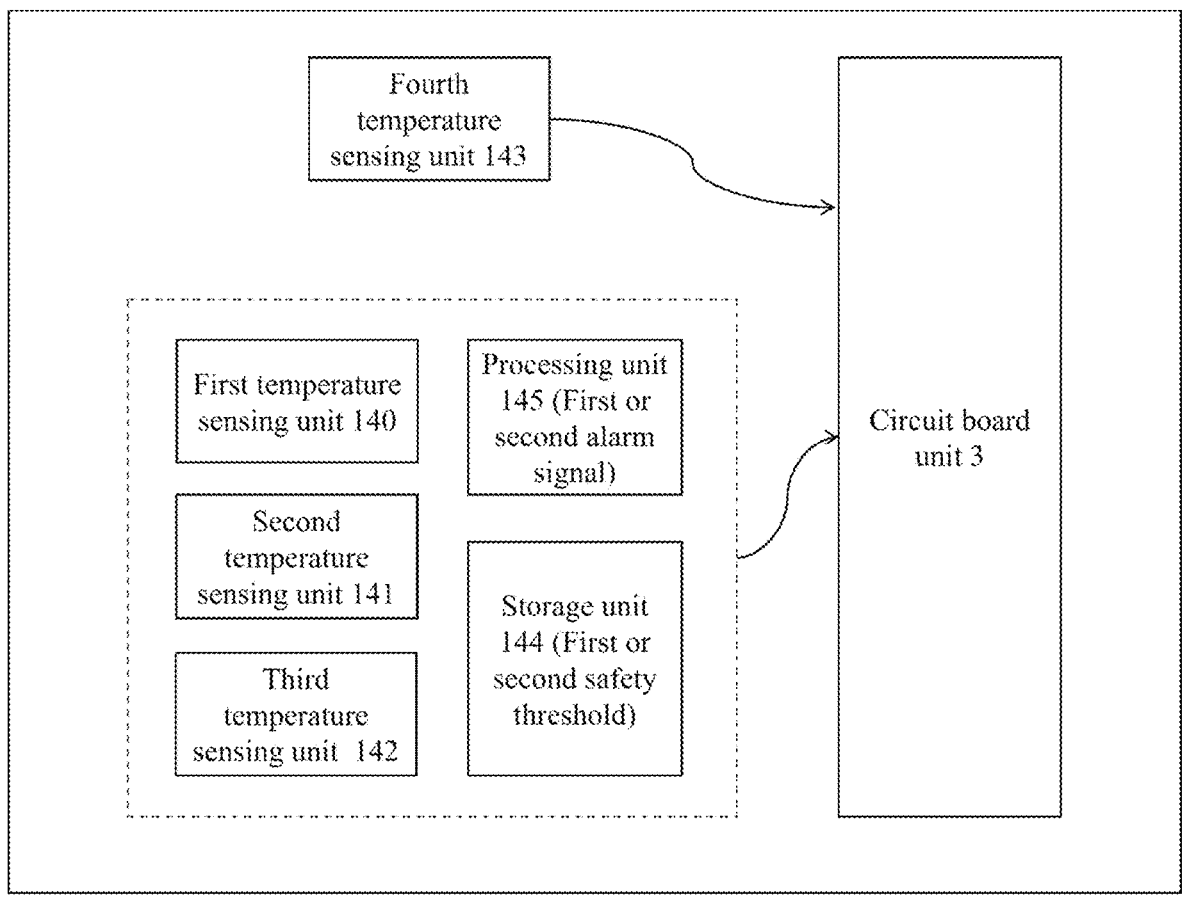
FIG. 7 shows a schematic diagram of the connection of multiple functional modules of the temperature measurement device of the present application.

As shown in FIG. 7, the posture detection system also includes a storage unit 144, which stores a first safety threshold and a second safety threshold. The posture detection system also includes a processing unit 145, which is configured to process the temperatures obtained by the first temperature sensing unit 140, the second temperature sensing unit 141, the third temperature sensing unit 142, and the fourth temperature sensing unit 143. The processing unit 145 includes a built-in processor integrated into the temperature measurement device or a remote processor set separately from the temperature measurement device. That is to say, the storage unit 144 or processing unit 145 can also be installed on a relay or charger used in conjunction with the temperature measurement device.

As shown in FIG. 7, the processing unit 145 is configured to take the minimum temperature measured by the first temperature sensing unit 140, the second temperature sensing unit 141, and the third temperature sensing unit 142 as the food temperature measured by the temperature measurement device.

In one embodiment, the storage unit 144 and the processing unit 145 are included in a chip which is set up in the circuit board unit 3. The chip is located in the low-temperature section 11. In another embodiment, the chip can be coated with a thermal isolating paint or coating.

The second thermal conductive column 1411 and the third thermal conductive column 1421 include flexible copper sheets, which can be in the form of plates or sheets. When the second thermal conductive column 1411 or the third thermal conductive column 1421 is placed inside the hollow cylinder 1, the flexible copper sheet is constrained by the internal space of the hollow cylinder 1 to bend and deform, forming the second thermal conductive column 1411 and the third thermal conductive column 1421. The second thermal conductive column 1411 and the third thermal conductive column 1421 are not in contact to avoid thermal conductivity between them.

Figure 8:
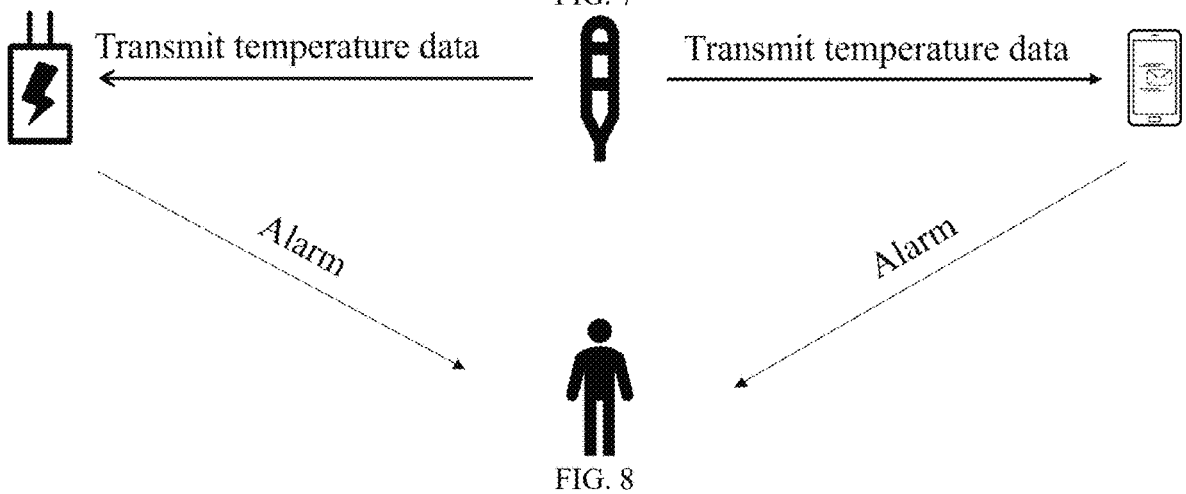
FIG. 8 shows a schematic diagram of a temperature measurement device in communication with a mobile device or relay and sending an alarm in one embodiment of the present application.

The temperature measurement device can also have a wireless communication unit, which is arranged on the circuit board unit 3. The wireless communication unit can be one or more of Bluetooth, GSM mobile communication, 3G mobile communication, 4G mobile communication, 2.4 GHz RF communication, 5.8 GHz RF communication, 433 MHz RF communication, and WIFI. As shown in FIG. 8, the temperature measurement device can be connected to a mobile device or a dedicated relay or charger for use with the temperature measurement device through a wireless communication unit, such as transmitting temperature information, remaining power, working time, etc. Mobile devices can include Internet connected smart cookware, personal computers, smart phones or other appliances. The repeater or charger may include a display or other device for receiving the first or second alarm signal emitted by the temperature measurement device and notifying the user of the temperature or safety alarm detected by the temperature measurement device or temperature measurement probe. Mobile devices may include "applications" or other software elements configured to display a user interface to the user, for receiving the first or second alarm signal sent by the temperature measurement device and notifying the user of the temperature or safety alarm detected by the temperature measurement device or temperature measurement probe. This user interface can display the corresponding temperature detected by each temperature measurement device or each temperature measuring probe. In addition, the "application" may display alerts, charging information, or cooking progress. In some embodiments, the temperature measurement device itself may also send an alarm based on the first alarm signal or the second alarm signal.

The above description is only the preferred embodiment of the present application and is not intended to limit the present application. Any modifications, equivalent substitutions, and improvements made within the spirit and principles of the present application should be included in the scope of protection of the present application.

What is claimed is:

1. A temperature measurement device, wherein the temperature measurement device comprises:
    a hollow cylinder comprising a low-temperature section inserted into food, a high-temperature section exposed to air, and a transition section separating the low-temperature section and the high-temperature section; and a posture detection system for detecting whether the low-temperature section and the transition section are completely inserted into the food,
    wherein, the posture detection system comprises a first temperature sensing unit arranged in the low-temperature section and configured to measure the temperature of a tip of the temperature measurement device, and a second temperature sensing unit arranged in the transition section and configured to measure the temperature of the transition section of the temperature measurement device,
    wherein the second temperature sensing unit comprises a second temperature sensing probe and a second thermal conductive column, the second thermal conductive column is coaxial with the hollow cylinder, and the second thermal conductive column is closely attached to an inner surface of the hollow cylinder to form a face-face coaxial thermal conductive channel for even heat transfer.

2. The temperature measurement device according to claim 1, wherein when the tip penetrates the food and is exposed to the air, the temperature measured by the first temperature sensing unit exceeds a first safety threshold, and the posture detection system detects a first incorrect posture of the temperature measurement device and sends a first alarm signal; when the tip is inserted in the food and the transition section is exposed to the air, the temperature measured by the second temperature sensing unit exceeds a second safety threshold, and the posture detection system detects a second incorrect posture of the temperature measurement device and sends a second alarm signal; when the tip and the transition section are inserted in the food and not exposed to the air, the temperature measured by the first temperature sensing unit is less than the first safety threshold, the temperature measured by the second temperature sensing unit is less than the second safety threshold, and the posture detection system does not send an alarm signal.

3. The temperature measurement device according to claim 2, wherein the second thermal conductive column is a hollow column extending along a length direction of the hollow cylinder and comprises a second inner surface and a second outer surface, the second temperature sensing probe is attached to the second inner surface, and the second outer surface is closely attached to the hollow cylinder.

4. The temperature measurement device according to claim 3, wherein the posture detection system further comprises a third temperature sensing unit arranged in the low-temperature section and located between the first temperature sensing unit and the second temperature sensing unit.

5. The temperature measurement device according to claim 4, wherein the third temperature sensing unit comprises a third temperature sensing probe and a third thermal conductive column, the third thermal conductive column is coaxial with the hollow cylinder, and the third thermal conductive column is closely attached to the hollow cylinder to construct the face-face coaxial thermal conductive channel.

6. The temperature measurement device according to claim 5, wherein the third thermal conductive column is a hollow column extending along the length direction of the hollow cylinder, the third temperature sensing probe is attached to an inner surface of the third thermal conductive column, and an outer surface of the third thermal conductive column is closely attached to the hollow cylinder.

7. The temperature measurement device according to claim 6, wherein when the tip and the transition section are inserted in the food and not exposed to the air, the temperature measurement device takes the minimum value of the temperature measured by the first temperature sensing unit, the second temperature sensing unit, and the third temperature sensing unit as a food temperature measured by the temperature measurement device.

8. The temperature measurement device according to claim 7, wherein the temperature measurement device further comprises a fourth temperature sensing unit arranged in the high-temperature section, wherein the fourth temperature sensing unit comprises a fourth temperature sensing probe and a fourth heat conductor, and the fourth temperature sensing probe is in contact with the fourth heat conductor.

9. The temperature measurement device according to claim 8, wherein the fourth heat conductor comprises a connecting portion for connecting the fourth temperature sensing probe, and a protruding portion extending outside the temperature measurement device.

10. The temperature measurement device according to claim 9, wherein the connecting portion is a hollow extension portion arranged at one end of the fourth heat conductor near the fourth temperature sensing probe, and the hollow extension portion is used to accommodate the fourth temperature sensing probe.

11. The temperature measurement device according to claim 10, wherein the temperature measurement device further comprises a handle arranged in the high-temperature section and connected to the hollow cylinder, wherein the connecting portion penetrates the handle and the protruding portion is located outside the handle.

12. The temperature measurement device according to claim 9, further comprising a circuit board unit extending from the low-temperature section to the high-temperature section, and the first temperature sensing unit, the second temperature sensing unit, the third temperature sensing unit, and the fourth temperature sensing unit are connected to the circuit board unit.

13. The temperature measurement device according to claim 9, wherein the posture detection system further comprises a storage unit, wherein the storage unit stores the first safety threshold and the second safety threshold.

14. The temperature measurement device according to claim 9, wherein the posture detection system further comprises a processing unit configured to process the temperatures obtained by the first temperature sensing unit, the second temperature sensing unit, the third temperature sensing unit, and the fourth temperature sensing unit.

15. The temperature measurement device according to claim 14, wherein the processing unit comprises a built-in processor integrated into the temperature measurement device or a remote processor separately set from the temperature measurement device.

16. The temperature measurement device according to claim 14, wherein the processing unit is configured to take the minimum value of the temperature measured by the first temperature sensing unit, the second temperature sensing unit, and the third temperature sensing unit as the food temperature measured by the temperature measurement device, the processing unit is included in a chip which is set up in the low-temperature section and is coated with a thermal isolating coating.

17. The temperature measurement device according to claim 14, wherein the second thermal conductive column and the third thermal conductive column comprise flexible copper sheets, and when the second thermal conductive column or the third thermal conductive column is placed in the hollow cylinder, the flexible copper sheets are deformed and bent by the hollow cylinder, forming the second thermal conductive column and the third thermal conductive column.

18. The temperature measurement device according to claim 17, wherein the second thermal conductive column does not contact with the third thermal conductive column.

19. The temperature measurement device according to claim 17, wherein the first temperature sensing unit comprises an elastic arm and a first temperature sensing probe, and the first temperature sensing unit extends from the circuit board unit to the inner wall of the tip through the elastic arm, so that the first temperature sensing probe is closely attached to the inner wall of the tip.

* * * * *